United States Patent
Rambert et al.

[11] Patent Number: 6,078,428
[45] Date of Patent: Jun. 20, 2000

[54] FASTENING OF A SUPPORT FOR ON-BOARD EQUIPMENT

[75] Inventors: Thierry Rambert, Saint Jean D'Illac; Jean-Marc Darrieux, Bordeaux, both of France

[73] Assignee: Sextant Avionique, Velizy Villacoublay, France

[21] Appl. No.: 09/209,757

[22] Filed: Dec. 11, 1998

[30] Foreign Application Priority Data

Dec. 12, 1997 [FR] France .................................. 97 15778

[51] Int. Cl.[7] .................................................. G02B 27/14
[52] U.S. Cl. .......................................................... 359/632
[58] Field of Search .................................. 359/630, 632, 359/817, 822; 345/7

[56] References Cited

U.S. PATENT DOCUMENTS

| | | | |
|---|---|---|---|
| 5,381,267 | 1/1995 | Woody | 359/632 |
| 5,479,294 | 12/1995 | Darrieux et al. | 359/630 |
| 5,517,337 | 5/1996 | Dupin et al. | 359/13 |
| 5,581,806 | 12/1996 | Capdepuy et al. | 2/6.2 |
| 5,748,346 | 5/1998 | David et al. | 359/15 |

FOREIGN PATENT DOCUMENTS

| | | |
|---|---|---|
| 0 123 020 | 10/1984 | European Pat. Off. . |
| 32 11 867 | 6/1983 | Germany . |

*Primary Examiner*—Ricky Mack
*Attorney, Agent, or Firm*—Oblon, Spivak, McClelland, Maier & Neustadt, P.C.

[57] ABSTRACT

Disclosed is a removable device for the supporting of equipment in an aircraft, especially to fasten the support of a head-up collimator with its projection system, above the seat of the pilot of the aircraft. To enable the support to be dismounted (for maintenance for example), and to be put back in place at its exact position, the fastening device is made as follows: it is hinged on the aircraft by a hinge and it is fastened by bolts enabling the fastening of the support according to an angle that is variable about a rotation axis. The device furthermore comprises a centering block that cooperates with a centering pawl, one of the two elements being part of the aircraft while the other is part of the support, the pawl being housed in a removable way in a positioning aperture formed in the centering block, the block comprising a cup filled with resin, the resin being used to define and maintain the position of the aperture with respect to the cup.

13 Claims, 4 Drawing Sheets

FASTENING OF A SUPPORT FOR ON-BOARD EQUIPMENT

BACKGROUND OF THE INVENTION

1. Field of the Invention

The invention relates to a device for fastening a support for on-board equipment in an aircraft enabling a precise positioning of the support with respect to the aircraft.

An aircraft comprises a large number of pieces of equipment generally fixed individually and in a removable or interchangeable way to enable especially the dismounting and quick replacement of a malfunctioning piece of equipment.

The structure of the aircraft may be provided with fastening or hooking lugs to which the equipment is for example screwed. The dimensions of the fastening lugs and of a piece of equipment correspond to each other within the limits of the manufacturing tolerances of the aircraft on the one hand and of the equipment on the other hand.

However, the manufacturing tolerances may be far too great for certain pieces of equipment such as an inertial guidance unit or a head-up display system whose use requires very precise positioning with respect to the entire structure of the aircraft.

A head-up display system, also known as a head-up collimator, enables the pilot to be provided with collimated information superimposed on his distant field of view.

A collimator has a projector, generally placed above the pilot's head, and a semi-transparent mirror placed before his eyes. The projector sends a collimated light beam containing information to the mirror. The mirror is transparent to the light rays sent by the scene and reflects the rays, coming from the projector, to the pilot's eyes. Thus, the pilot can read the information while at the same time observing the scene.

A head-up collimator is used in civil aviation for landing. It enables the display of an image of the landing strip that is in accordance with the real terrain. The only way to superimpose the image on the scene without having a disturbing offset is to position the collimator very precisely in relation to the geometrical references of the structure of the aircraft.

2. Description of the Prior Art

This positioning is achieved during an operation for harmonizing a collimator with a carrier aircraft. For an aircraft, this harmonizing operation consists in mounting it on jacks, placing it horizontally to the ground, defining geometrical references by using optical instruments and adjusting the position of the collimator with respect to these geometrical references by means of a sighting telescope. The geometrical references of the aircraft are generally represented by a target fixed to the ground. A sighting telescope is fixed to the collimator and then the position of the collimator is adjusted until the telescope is trained on the target.

The operation of harmonization ends with the fastening to the aircraft of the collimator in the adjusted position.

The operation for harmonizing a piece of equipment with its aircraft is lengthy, limited by constraints and costly. It is therefore sought to avoid repeating this operation after each dismounting of equipment. The problem is to enable the dismounting and remounting of a piece of equipment on board the aircraft with high precision.

A partial approach consists of the use of an equipment support. The support may be hooked and secured to the support and it can also be dismantled.

The mounting of equipment on the support is reproducible with sufficient precision to remove the need for the operation of harmonizing the aircraft with the equipment and to be able to obtain satisfaction the operation of harmonizing the aircraft with the support. The latter operation is as cumbersome as the former one, but enables the dismounting, replacement and remounting of the equipment while guaranteeing that the equipment will be rightly positioned.

However, during certain operations for the maintenance of the aircraft, it is necessary to dismantle also the support. The problem then is to provide for the precise remounting of the support in avoiding a new operation of harmonization.

SUMMARY OF THE INVENTION

This is why the invention proposes a device for fastening an equipment support for an aircraft enabling the precise positioning of the support in the aircraft. The device according to the invention enables the dismounting of the support and the remounting with the same precision of positioning.

More specifically, the invention relates to a device for the fastening of an equipment support to an aircraft comprising a supporting hinge on at least one axis of rotation, at least one fastening means, for example a bolt, for fastening the support to the aircraft, enabling the fastening of the support according to an angle that is variable about the rotation axis, a centering block cooperating with a centering pawl, one of the two elements being part of the aircraft while the other is part of the support, the pawl being housed in a removable way in a positioning aperture formed in the centering block, the block comprising a cup filled with resin, the resin being used to define and maintain the position of the aperture with respect to the cup. The pawl, which is housed tightly in the positioning aperture, can come out of it during a operation for dismounting the support and re-enter it during an operation for remounting the support.

The invention also relates to a method for the removable fastening of a support for equipment on an aircraft by means of a fastening device of this type wherein, during a first fastening of the support in a reference position, the initially empty cup is filled with resin which, in hardening around the centering pawl, defines a reference position for the positioning aperture. During a dismounting and a new fastening, the support is mounted again in placing the fastening pawl in the aperture.

BRIEF DESCRIPTION OF THE DRAWINGS

Other features and advantages of the invention shall appear from the following detailed description of some special embodiments, with reference to the appended drawings, of which.

DETAILED DESCRIPTION OF THE DRAWINGS

Figure 1:
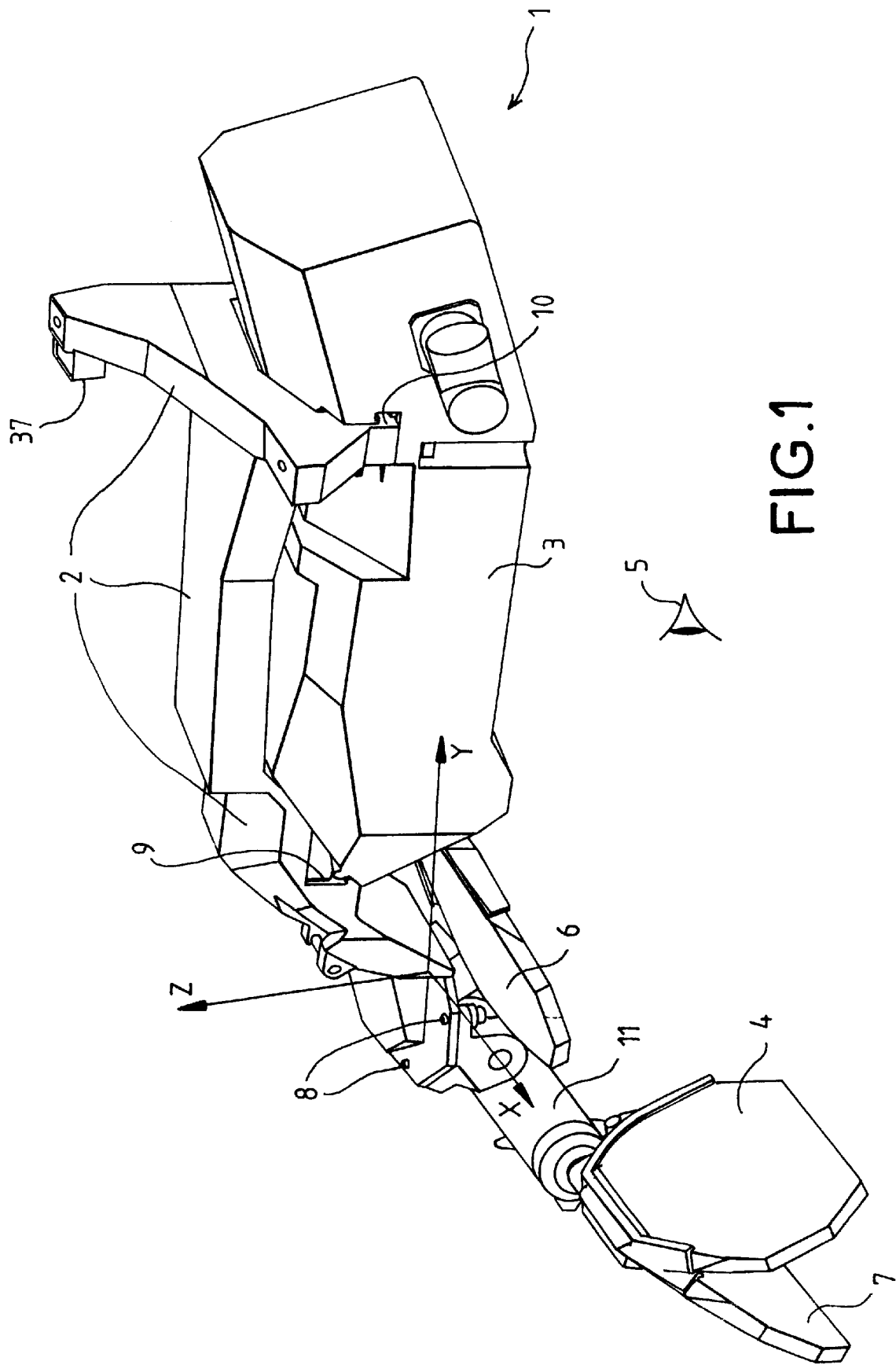
FIG. 1 shows a head-up collimator mounted in a support.

FIG. 1 is a view in perspective of a head-up collimator 1 mounted in a support 2.

The collimator has a projector 3 and a semi-transparent mirror 4 in the position of use where it is placed before the user's eye 5.

The mirror also has a stowaway position 6 to clear the user's field of vision when he is not using a collimator. It also has a safety position 7 to clear a space for the user's face if the pilot should be ejected from his vehicle.

The projector 3 comprises an imaging device on whose screen an image is formed and a collimation optical system to focus the image at infinity, namely in the plane of the scene. The collimated light is sent to the mirror 4 which ensures that the user 5 will have the image superimposed on the view of the landscape.

The projector 3 and the mirror 4 are two mechanically independent elements. They are fixed, without clearance, to the support. The mirror 4 is fixed for example to its arm 11 by means of several screws 8. The projector 3 is fixed by means of screws. Stops 9, 10 formed on the support 2 facilitate the mounting of the projector in preventing it from having to be held up during the screwing operation.

In this embodiment, the support has a single position for holding the collimator.

The support enables the dismounting of the collimator by the unscrewing of the screws 8 in the case of the mirror 4 and by unscrewing, lifting and separating in the case of the projector 3.

Figure 2:
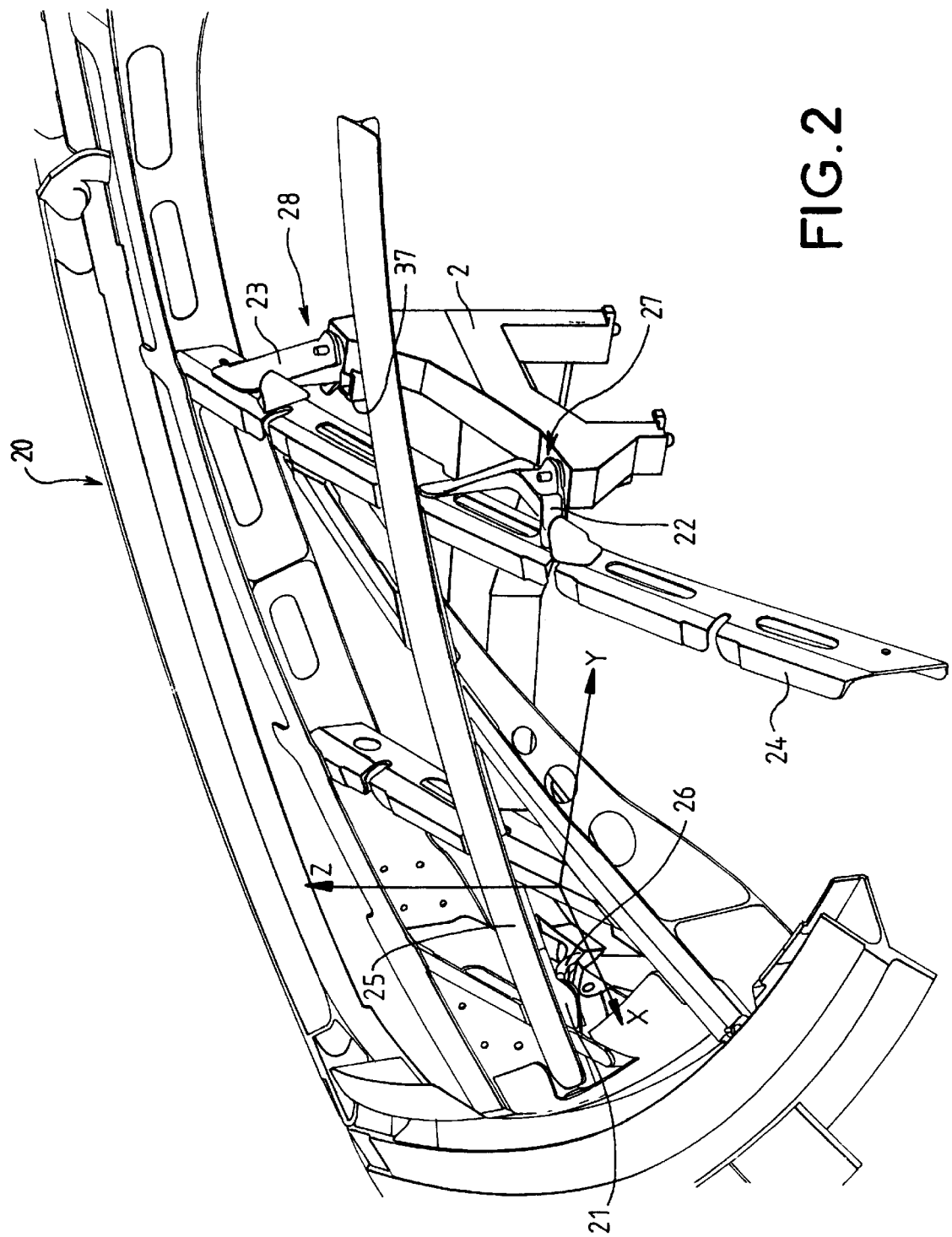
FIG. 2 shows a head-up collimator support and a part of an aircraft in which it is fastened according to the invention.

FIG. 2 shows a part of the structure 20 of an aircraft. More particularly, this part is the ceiling of the cockpit. The support 2 of the head-up collimator is shown here as being fixed to the structure 20.

In this embodiment, the structure 20 of the aircraft has fastening lugs 22, 23 that are held rigidly in a beam 24 of the aircraft, for example by soldering or riveting. The structure 20 of the aircraft also has a lug 21 held rigidly to a beam 25.

The link between the structure 20 and the support 2, which is similar to the one shown in FIG. 1, is provided by a hinge corresponding to the lug 21 and by two fastening points 27, 28 corresponding respectively to the two fastening lugs 22, 23.

The hinge is a hinge with three degrees of liberty in rotation and is therefore formed by means of a pivot or trunnion 26 fixedly joined to the lug 21. The trunnion 26 preferably has no clearance.

The fastening means 26, 27 and 28 of the support in the aircraft enable the position of the support to be adjusted with reference to the structure of the aircraft. The adjustment is done by rotation about three orthogonal axes X, Y and Z of the geometry of the aircraft.

When the hinge is formed by a trunnion, the three axes concur at its center but this arrangement is not obligatory.

The system of three axes X, Y and Z is for example such that the axis Z is substantially vertical and the axis Y is perpendicular to the substantially vertical plane containing both the axis Z and the two fastening points 27 and 28. The axis X is orthogonal to the axes Y and Z.

When the support 2 is fixed to the aircraft by the trunnion 26 and is not fixed to the fastening lugs 22 and 23, it cannot move in translation with respect to the aircraft but is free in rotation on the three axes X, Y and Z.

The operation of harmonizing the support 2 with the aircraft consists in adjusting and fixing the orientation of the support with respect to the three axes.

The operation is generally done by means of a sighting telescope fixedly joined, during the operation, with the support 2 and a harmonization panel fixedly joined to the aircraft. The panel is used as a target for the telescope. The orientation of the support enabling the sighting telescope to be trained on the target is the orientation that makes the geometrical reference coincide with the information collimated with the geometrical reference of the aircraft bearing the collimator. This is the orientation of harmonization. It corresponds to a reference position of the support.

In this example, the orientation is adjusted with a precision of 0.1 milliradian.

Figure 3:
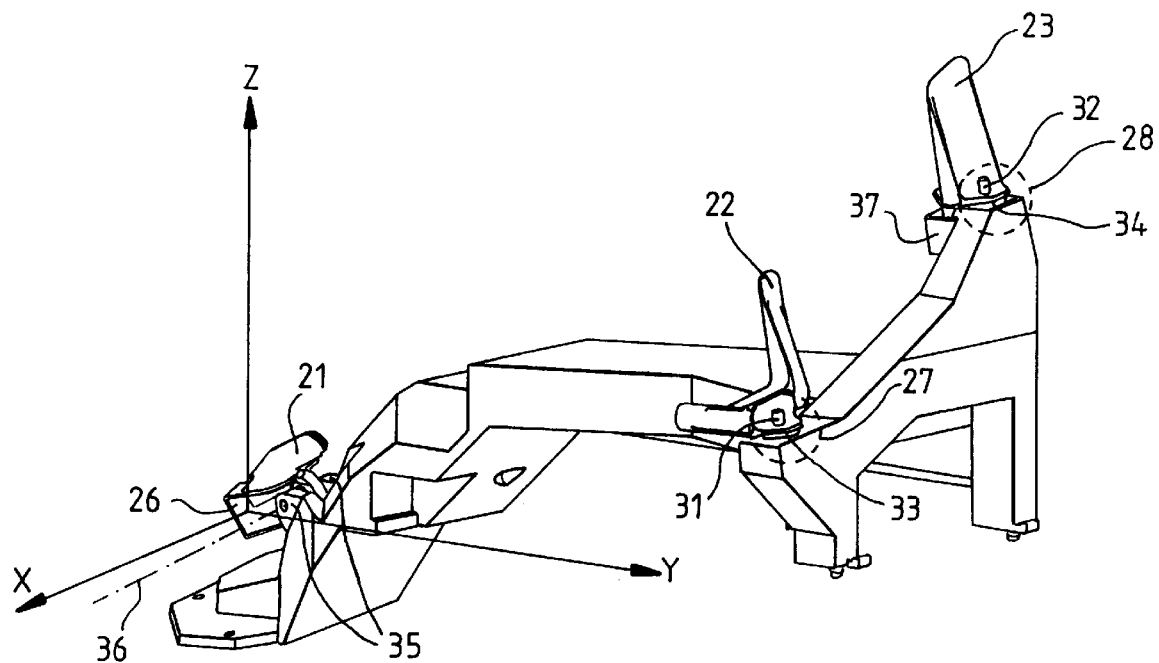
FIG. 3 shows a collimator support with the fastening lugs of the aircraft and the fastening device according to the invention.

FIG. 3 shows the same support 2 of equipment but the depiction of the structure of the aircraft is highly reduced. It is limited to the depiction of the two fastening lugs 22, 23 already described and the lug 21 bearing the trunnion 26. The lug 21 is fixed rigidly to the structure of the aircraft, for example in the same way as the lug 22 or the lug 23.

FIG. 3 shows the trunnion 26 fixedly joined to the fastening lug 21 of the aircraft. At this level, the support 2 has a yoke 35 bearing a pin 36 that supports the trunnion 26 which for example is parallel to the axis X of the reference of the rotations. In this case, the trunnion is mounted by the aircraft manufacturer on the aircraft and the support 2 comprises a supporting pin 36 compatible with the trunnion provided. An alternative embodiment of the invention consists in reversing the fastening at the lug 21 with respect to the description of FIG. 3. In other words, in this variant the trunnion is fixedly joined to the support 2 and the supporting pin is fixedly joined to the lug 21.

According to the invention, the rotational motions of the support 2 along the two axes X and Y are blocked at the points 27 and 28 at which the support is fastened to the corresponding lugs 22 and 23 of the aircraft.

This blocking can be done by an adjustable screw mechanism for each of the fastening points 27, 28. But it is preferably obtained by an assembly comprising, for each fastening point 27 or 28, a shim 33, 34 between the lug of the aircraft 22, 23 and the support 2 and a fastening bolt 31, 32. The bolt 31, 32 grips the support 2 to a first face of the shim 33, 34 and it grips, at the same time, a second face of the shim, opposite the first one, to the fastening lug 22, 23. The distance between the first face and the second face of a shim 33 or 34 is the thickness of the shim.

A variation of the orientation of the support 2 according to the rotation on the axis X is achieved through the increasing, by one and the same quantity, of the thickness of the two shims 33 and 34. And a variation of the orientation of the same support 2 according to the rotation on the axis Y is achieved by the modification of the thickness of one of the two shims 33 and 34 or else by the modification of the thicknesses of both these shims by different quantities for each of the shims.

In the exemplary support for a head-up collimator defined here above, the thickness of each of the shims ranges from 0 to 8 millimeters.

The fastening bolt 31 is preferably a screw mounted with a nut that is not fixed on the fastening lug 22 side. The lug 22 has an aperture through which the screw passes. And at the fastening point 27, the support 2 has a hole, preferably circular, in which the screw is fixed. The shim 33 corresponding to this fastening point 27 is preferably a washer with an adjustable thickness and the screw of the bolt 31 goes through the washer.

The adjustable washer may be a peel-off washer formed by a material made of superimposed layers with a multilayered structure in the thickness of the washer. The reduction of the thickness of the washer is obtained by peeling off or removing one or more layers of material.

The second fastening point 28 is similar for example to the first fastening point 27.

The apertures in the lugs 22, 23 for the fastening points 27 and 28 are preferably elongated along the direction of the axis X. These apertures may be oblong holes.

These apertures enable a rotational motion, on the axis Z starting from the trunnion 27, for the support 2. This support 2 is linked to the aircraft by the trunnion 26 and its rotational motions along the axes X and Y are blocked by means of the shims 33, 34.

According to the invention, the support 2 also comprises a centering block working together with a lug 23 of the aircraft to block the rotational motion of the support on the axis Z. This centering block is essentially formed, as we shall see, by a cup 37 fixed to the support 2 and filled with resin.

Figure 4:
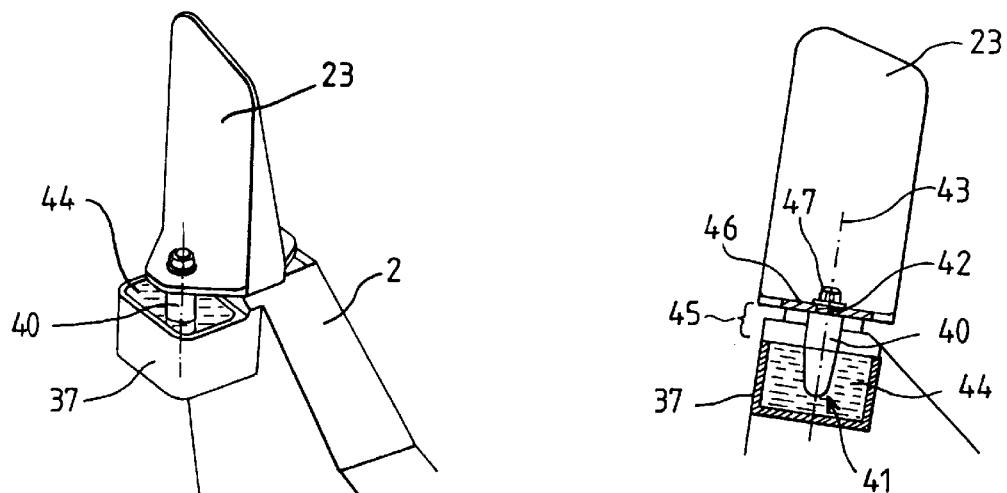
FIG. 4 shows a detail of an embodiment of the invention.

FIG. 4 shows a partial view of a particular embodiment of the invention. This view corresponds to the centering block. It shows a cup 37 which can be also be seen in FIG. 3. It is part of the support 2. It is open on its upper face facing a part of the fastening lug 23 which is provided with a centering pawl 40. The centering pawl 40 is part of be part of the lug 23 may be part of the lug 23 but it is preferably formed by a part distinct from the lug and fixed rigidly by one of its ends to the lug 23. At this first end, the pawl has for example a thread 47 and a shoulder 46 enabling it to be screwed in without clearance and secured to the lug 23 at an aperture 42 of this lug 23. The pawl is fixedly joined to the aircraft.

In this embodiment, the pawl 40 has a symmetry of revolution about a longitudinal axis 43. The pawl is cylindrical at its center 45 and gets thinner at its second end, opposite the first end described which is for example conical.

The cup 37 is filled with a resin 44 which has a cavity 41 in which there is housed the second end of the pawl 40. The shape of the cavity 41 matches this second end of the pawl. When the centering pawl is inserted therein, the cavity prevents any rotational motion of the support 2 about the axis Z. The cup with its resin and the cavity 41 form a centering block, and the cavity 41 constitutes a positioning aperture working together with the centering pawl to define the angular orientation of the support around the axis Z.

The assembly formed by the fastening bolts 31, 32 and the centering lock maintains the support according to the orientation of harmonization.

The end of the pawl in contact with the resin has an adhesive-proof treatment on its surface. This pawl can thus easily be dissociated from the resin 44 and the support can easily be dismounted from the aircraft by the releasing of the fastening bolts 31 and 32. The adhesive-proof treatment makes it possible to avoid damaging the surface of the cavity 41 in the resin 44 or the surface of the corresponding end of the centering pawl 40 during the dismounting.

The resin is a non-shrinkable rigid bonder. It may be a polyurethane bonder or preferably an epoxy bonder. Epoxy resin is valuable because it can be easily implemented. It is a mono-constituent bonder which does not require any special preparation and is in liquid form before solidification.

To make the centering block, the support 2 is positioned in the harmonization orientation. The centering pawl 40 of the lug 23 is then partly in the cup 37 of the support 2. Then a quantity of resin is poured or injected into the cup. The resin spreads in the cup and surrounds the second end of the pawl 40. The resin fills the space in the cup that has been left free by the centering pawl.

After solidifying, the resin is hard and has an aperture for positioning the pawl. The shape of this aperture exactly matches that of the pawl. The resin is preferably fixedly joined to the cup. It is joined to the cup during solidification. In one variant, the cup used has an internal face with an adhesive-proof surface treatment. The solidified resin is then removable. In this case, the cup has a certain degree of asymmetry and the resin is thus replaced without any error of orientation in its cup.

In the embodiment of FIG. 4, the cup is oriented so that its aperture is on its upper part. The cup has the advantage of being capable of containing liquid resin by gravity.

In this embodiment, it is noted that the longitudinal axis 43 of the pawl 40 is not greatly inclined with respect to the substantially vertical axis Z. The axis 43 is for example vertical. Thus the resin poured into the cup 37 simply coats the conical end of the pawl 40 by gravity.

The upper face of the cup 37 has a fairly wide aperture to allow for the manufacturing tolerances of a support 2 and the carrier aircraft. The harmonizing of a support with its aircraft corresponds to a fine adjustment around the standard position of the support in the aircraft. The standard position corresponds for example to the centering of the pawl in the cup. The range of the fine adjusting is limited to the holding of the pawl in the cup. Depending on the model of the support and that of the aircraft, the pawl is shifted to varying degrees from the middle of the upper face of the cup.

After dismounting, the support can be mounted again on the aircraft by fixing the support to the trunnion 16, in reusing the adjusted shims 33 and 34, by placing the centering pawl in the aperture of the resin and tightening the fastening bolts 31, 32.

For a fastening bolt, the same tightening torque is applied again at each remounting to ensure the identical deformation of the fastening.

The fastening assembly described enables a remounting that is precisely in conformity with the initial harmonizing orientation. The precise positioning of the support in the aircraft is reproducible after dismounting without any new operation to harmonize the support with its aircraft.

Figure 5:
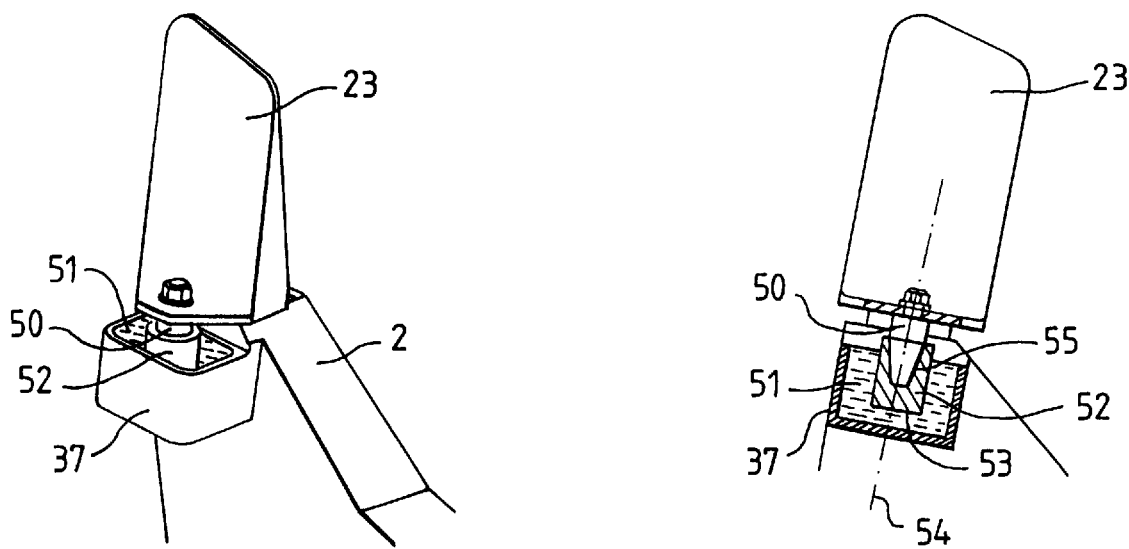
FIG. 5 shows a detail of another embodiment of the invention.

FIG. 5 shows a detail of another embodiment according to the invention of a centering block with its centering pawl. In this preferred embodiment, a centering pawl 50 is fixed rigidly to the fastening lug 23, for example by screwing by means of a thread and a shoulder as in the embodiment already described and illustrated in FIG. 4.

This FIG. 5 also has a cup 37 filled with resin 51, for example an epoxy resin.

The pawl 50 is housed in a sleeve 52 which is itself is housed in a cavity 53 of the resin 51. The cavity 53 made of resin is shaped to match the lower part of the external surface of the sleeve 52.

The sleeve preferably has a symmetry of revolution about an axis 54. It is for example cylindrical on its external face in contact with the resin 51 and conical on its internal face 55 forming a cavity in which the pawl 50 is housed. The cavity preferably has a bottom.

The pawl also has, for example, a symmetry of revolution about the axis 54 with a thread at a first end, a central part with a cylindrical shape and a second end supported by a cone whose tip is rounded.

This conical end is placed in the cavity of the sleeve 52. The assembly comprising the sleeve 37, the resin 51 and the sleeve 52 forms a centering block and the aperture of the sleeve forms the positioning aperture of the centering pawl.

The sleeve and the pawl are for example made of metal. When the support is fixed to the aircraft, the centering pawl is simply in contact with the centering block at the concave surface 55 of the sleeve 52. It is not bonded thereto.

During the dismounting of the support, the fastenings to the points 27 and 28 are undone and the centering block fixed to the support is released from the pawl 50 by rotation of the support about the trunnion 26.

In this preferred embodiment, the sleeve 52 is fixedly joined to the resin 51.

To obtain the centering block, the support 2 is positioned in the aircraft by the harmonization orientation, for example by means of a sighting telescope and reference targets. Harmonizing shims 33 and 34 are made to measure in order to block the orientation of the support along the rotations of axes X and Y. The support 2 is fixed to the aircraft in the harmonizing position by the tightening of the bolts 31 and 32. The sleeve 52 is held, for example by adhesion, to the pawl 50. The assembly formed by the sleeve and the pawl is then located in the empty cup 37. The centering pawl is protected by the sleeve during the making of the centering block.

The internal volume of this buck is such that the sleeve does not touch the internal wall of the cup. The position of the support is for example adjustable around a position such that that the sleeve protecting the pawl is in the middle of the cup. The support may be adjusted with a setting range limited by the positions of the support placing the internal wall of the cup in contact with the sleeve borne by the pawl. This adjusting range corresponds at least to the tolerances accepted on the geometry of the aircraft, namely the divergence values accepted in the positions of the hooks 22 and 23 with respect to the geometrical reference of the aircraft.

In the harmonizing position, a liquid resin is poured into the cup around the sleeve. The sleeve 52 of FIG. 5 has a bottom. Thus the resin surrounds the sleeve on a major part of its height but not does penetrate the cavity of the sleeve and is not in contact with the centering pawl 50. The sleeve is plunged partially into the resin. The resin fills the free space between the sleeve and the cup. The resin hardens by polymerization. The position of the sleeve in the cup is blocked by the resin. In this preferred embodiment, the sleeve 52 is fixed in the cup by the resin 51. The sleeve, the resin and the cup are fixedly joined together. The cavity of the sleeve is resistant to contact and shocks with the pawl 50 when the support is mounted again on the aircraft. The cavity of the sleeve is more resistant than the cavity 41 made of resin described in the embodiment of FIG. 4. Through its strength, the fastening of FIG. 5 with the additional element that is the sleeve ensures a more efficient reproduction of the positioning of the support in the aircraft during numerous remounting operations.

In alternatives to the embodiment of FIG. 5, the resin may be removable from the cup. This can be obtained for example by using a cup whose internal face has been given adhesive-proof treatment. The sleeve too may be removable from the resin by using a sleeve that has undergone equivalent surface treatment. In these variants, the accurate repositioning of the support in the aircraft requires the efficient repositioning of the various removable elements. It is necessary to keep to the orientation of the resin with respect to the cup which fixes the orientation of the sleeve and therefore that of the support with respect to the aircraft, for example by having a geometry of the elements in contact with the resin such that the mounting of the sleeve in the hardened resin and the placing of the resin in the cup leads only to a single positioning of the sleeve in the cup. These alternatives make it possible, for a given aircraft, to replace a support while keeping the shims and the positioning resin. If a new support properly reproduces the geometrical characteristics of the support used during the adjusting in the harmonizing position, the harmonizing position is also provided for the new support with the reutilization of the shims and resin of the initial support.

The fastening of the equipment support described for a head-up collimator can be used for any equipment having constraints of high precision with regard to its positioning in the aircraft. Such equipment could include, for example, an inertial guidance unit.

What is claimed is:

1. A device for the fastening of an equipment support to an aircraft comprising a supporting hinge along at least one axis of rotation, at least one fastening means, for fastening the support to the aircraft, enabling the fastening of the support according to an angle that is variable about the rotation axis, wherein the device comprises a first element being a centering block that cooperates with a second element being a centering pawl, one of the two elements being part of the aircraft while the other is part of the support, the pawl being housed in a removable way in a positioning aperture formed in the centering block, the block comprising a cup filled with resin, the resin being used to define and maintain the position of the aperture with respect to the cup.

2. A device according to claim 1, wherein the hinge is a trunnion.

3. A device according to claim 1, wherein the positioning aperture is a cavity in the resin of the cup.

4. A device according to claim 3, wherein the centering pawl has an adhesive-proof surface.

5. A device according to claim 1, wherein the device comprises a sleeve serving as a positioning aperture for the centering pawl, this sleeve being plunged into the resin.

6. A device according to claim 5, wherein the sleeve is metallic.

7. A device according to claim 1, wherein the centering block is part of the support and the centering pawl is part of the aircraft.

8. A claim according to claim 1, wherein the resin is an epoxy resin.

9. A device according to claim 1, wherein the support is mobile in rotation in the aircraft on three axes, X, Y, Z and comprises means to block the rotational motion of the support on two of these axes, X, Y, the blocking on the remaining axis being achieved by the housing of the centering pawl in the positioning block.

10. A device according to claim 9, wherein the blocking of the motion on two of its axes is achieved by means of bolts and adjusting shims of the support with the aircraft.

11. A method for the removable fastening of a support for equipment on an aircraft by means of a fastening device according to claim 1 wherein, during a first fastening of the support in a reference position, the initially empty cup is filled with resin which, in hardening around the centering pawl, defines a reference position for the positioning aperture.

12. A method of removable fastening according to claim 11, wherein the resin is poured into the space of the cup left free by the centering pawl.

13. A fastening method according to claim 11, wherein the resin is poured into the space of the cup left free by the centering pawl protected by a sleeve.

* * * * *